(No Model.)  3 Sheets—Sheet 1.
G. THEOBALD.
HARNESS SADDLE TREE.
No. 368,862. Patented Aug. 23, 1887.
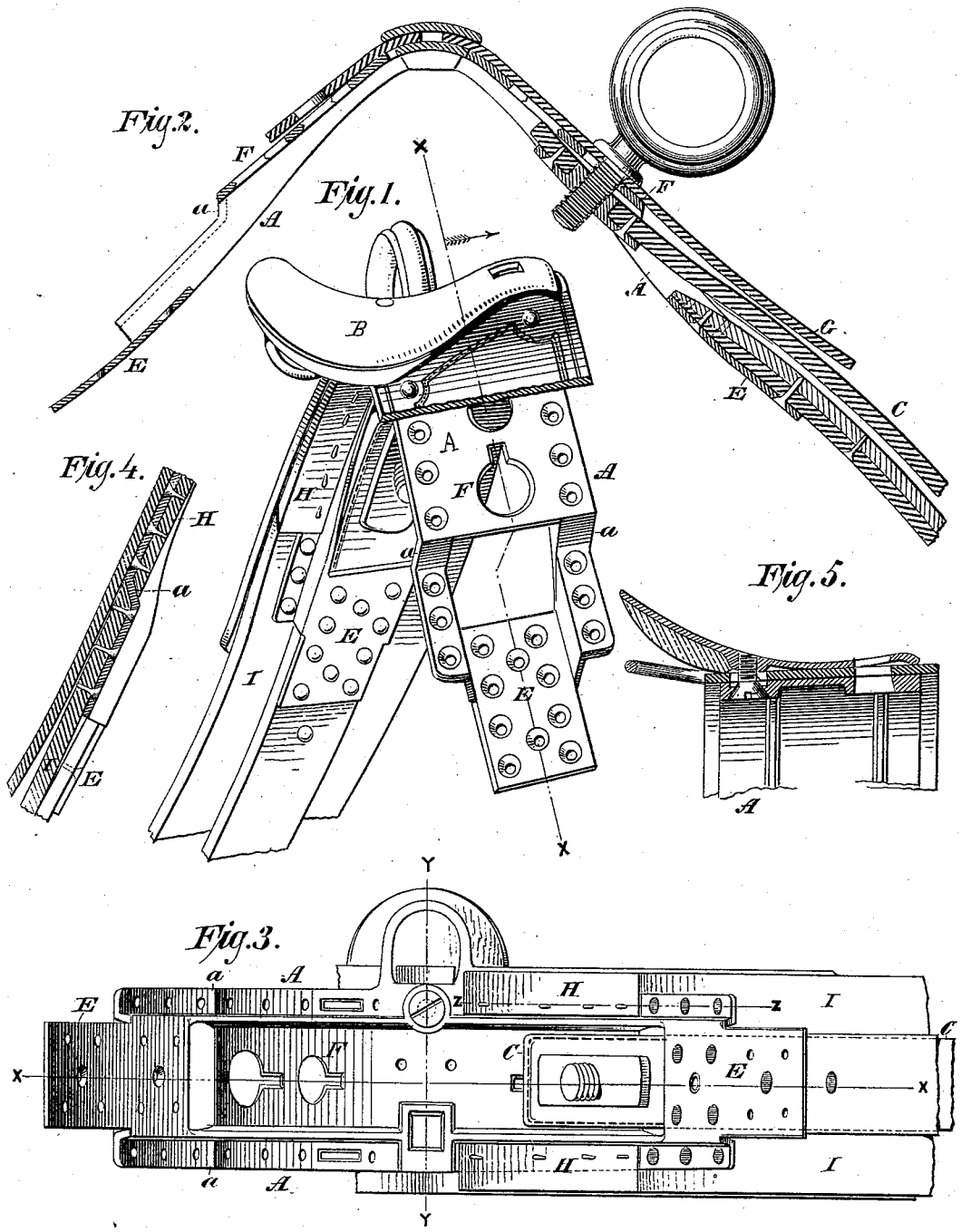

(No Model.) 3 Sheets—Sheet 2.

G. THEOBALD.
HARNESS SADDLE TREE.

No. 368,862. Patented Aug. 23, 1887.

WITNESSES:
Gustave Dieterich
Wm. Goebel.

Geo. Theobald,
INVENTOR,
BY J. C. Clayton,
ATTORNEY (No Model.) 3 Sheets—Sheet 3.
G. THEOBALD.
HARNESS SADDLE TREE.
No. 368,862. Patented Aug. 23, 1887.
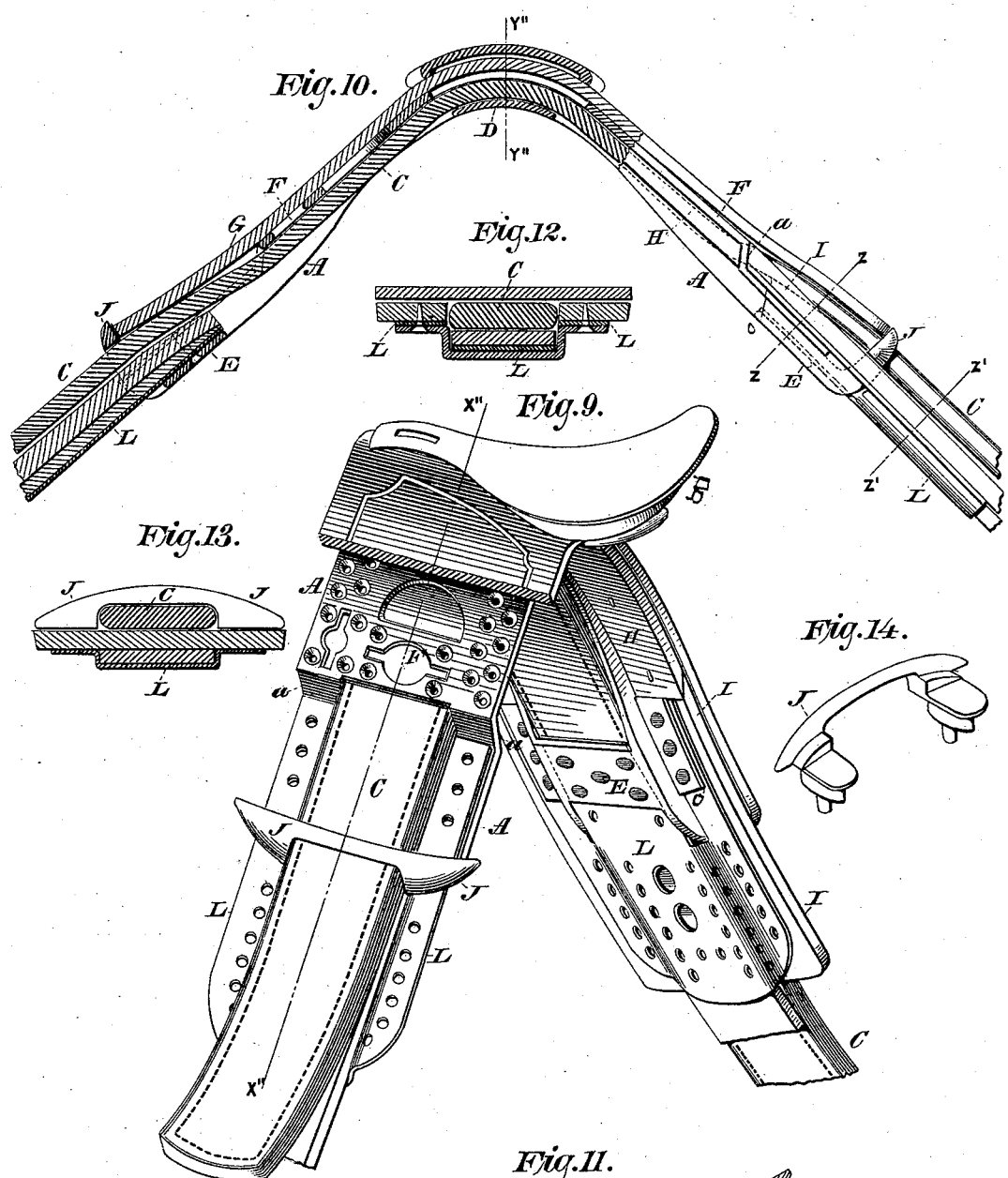

UNITED STATES PATENT OFFICE.

GEORGE THEOBALD, OF NEWARK, NEW JERSEY, ASSIGNOR TO THE RUBBER AND CELLULOID HARNESS TRIMMING COMPANY, OF SAME PLACE.

HARNESS-SADDLE TREE.

SPECIFICATION forming part of Letters Patent No. 368,862, dated August 23, 1887.

Application filed March 26, 1887. Serial No. 232,488. (No model.)

*To all whom it may concern:*

Be it known that I, GEORGE THEOBALD, a citizen of the United States, and a resident of Newark, in the county of Essex and State of New Jersey, have invented certain new and useful Improvements in Saddle-Trees, of which the following is a specification.

My invention consists in certain improvements in harness-saddles, fully set forth hereinafter, whereby I secure a simpler and better construction with cheapness of labor and material.

The drawings fully show the construction and arrangement of parts.

Similar letters refer to like parts in the several figures.

Figure 6:
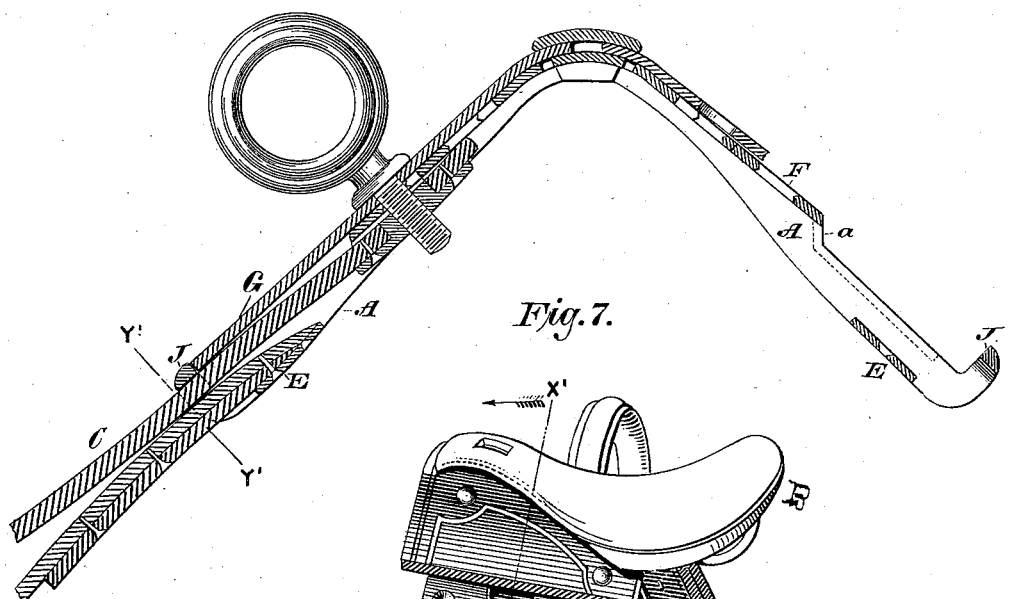
Figure 7:
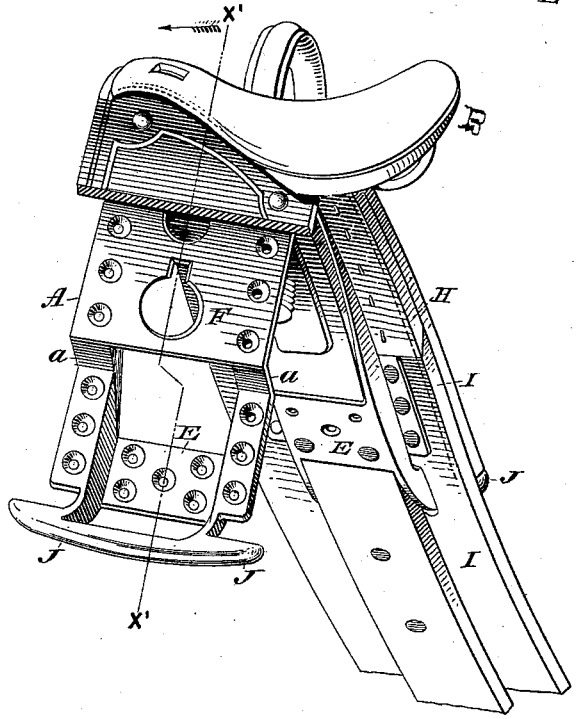
Figure 8:
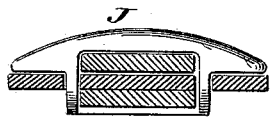

Figure 1 is a perspective view of my saddle and saddle-tree with a portion of the leathers removed. Fig. 2 is a section through line $x\,x$ of Fig. 1. Fig. 3 is an under-view of Fig. 1. Fig. 4 is a section cut through line $z\,z$ of Fig. 3. Fig. 5 is a section through line $y\,y$ of Fig. 3. Fig. 6 is a section through line $x'\,x'$ of Fig. 7. Fig. 7 is a perspective view of a tree with ornamental and protective ends cast to the tree. Fig. 8 is an end view of ornamental and protective ends cut through line $y'\,y'$ of Fig. 6. Fig. 9 is a perspective view showing the ornamental protective ends cast or riveted to the tree, with extension-plate or stiffener attached, and back-band flap and jockey, as used upon the tree. Fig. 10 is a section of Fig. 9 through line $x''\,x''$. Fig. 11 is a section of Fig. 10 through line $y''\,y''$. Fig. 12 is a section through line $z\,z$ of Fig. 10. Fig. 13 is a section through line $z'\,z'$ of Fig. 10. Fig. 14 is a detail showing the ornamental protective end when cast separately, and is provided with rivets to rivet it to the tree.

In the drawings similar characters refer to like parts.

The drawings are so clear and elaborate that there is no need of extended verbal description.

A is the cast-iron frame of the tree, of the construction shown in the drawings. At each side of the frame, about an inch and one-half from the ends, is a depression or jog, $a$, cut or formed at an angle for the upper end of the flap to abut against.

B is the seat.

C is the back-band.

D is the under or middle bridge, to be used as a bridge when a running back-band is used.

E E are the lower end bridges.

F F is that portion of the tree which acts as a terret-bridge.

G is the jockey, one on each side of the tree.

H H are the flaps. These flaps are much shorter than those used in other trees, and their upper ends abut against the jog $a$, just below the level of the terret-bridge F. They are riveted to that portion of the upper surface of the frame A which is below jog $a$.

I I are under leathers or strips riveted to the under edges of the upper part of the sides of the frame, so as to be as near as may be in line with the flaps H H.

J J are end pieces, either cast to or riveted to the lower ends of the tree to protect and give a finish to the ends of the flaps, and also to hold in place or guide the back-bands.

L L are extension-pieces or stiffeners of the construction shown, and nailed to the lower ends of the tree before the flaps are applied. These stiffeners may be provided with a longitudinal recess to receive the back-band.

In my improved tree I may make up a saddle so as to use either a running back-band passing clear over the tree; or each end of the back-band may be secured by a terret to the terret-bridge.

In making a saddle on my improved tree, I nail strips of leather I I on the under surfaces of the tree above the jog $a$, as seen in Figs. 1, 7, and 9. Fig. 4 shows them nailed on. The flaps H H are much shorter than usual, (thus saving much stock,) and abut up against the jog $a$, as seen in Figs. 2, 6, and 10. These flaps pass up under the protective end pieces, J J, and have their tongues $o\,o$ cut so as to settle down and permit the back-band to pass over them and under the main body of the tree, as shown in Figs. 2, 6, 9, and 10. The body of the tree above jog $a$ being flat on its upper surface makes it firm, strong, and also a capital job when the jockeys G G are sewed down to under strips, I I, and flaps H H. This secures just as good a job as if long flaps extending up to the seat were used, and saves much stock.

In Fig. 9 is shown a saddle made upon my tree so that the back-band runs clear over the tree, under protective ends J J, over the lower bridges, E E, under the flat surface of the body of the tree, and over the sunken bridge D at the top of the tree, and the terrets are fastened to the terret-bridges F F. When the ends of the back-band are secured to the terret-bridge, as shown in Fig. 11, there is no need of the middle or sunken bridge, D, and the tree may be made omitting that bridge. This can be done, and sometimes is done, with small trees.

What I claim as my invention is—

1. A saddle-tree in which the frame A is provided with jogs $a\ a$, against which the upper ends of the flaps abut, substantially as specified.

2. A saddle-tree in which the frame A, provided with jogs $a\ a$, is combined with the protective end pieces, J J, substantially as set forth.

3. A saddle-tree in which the frame A, provided with jogs $a\ a$, is combined with a sunken bridge, D, at the top, substantially as set forth.

4. A saddle-tree in which the frame A, provided with jogs $a\ a$, is combined with end pieces, J J, sunken bridge D, and metallic stiffeners or extension-pieces L L, substantially as set forth.

5. In combination with the iron frame A, provided with jogs $a\ a$, the under strips, I I, and short flaps H H, adapted so that the jockeys can be sewed to said strips and flaps, constructed and operating substantially as set forth.

6. The combination, in a saddle-tree, of the sunken bridge over which the back-band passes, the flat upper surface under which the back-band passes, the sunken bridges at the lower ends over which the back-band passes, and the protective ends under which the back-band passes, the whole arranged substantially as specified.

7. The combination, in a saddle-tree having the sunken bridges and flat surface or seat for the back-band, of the leather strips filling the under cavity above the jogs, the stiffeners at the lower ends, and the short flaps abutting against the jogs, substantially as specified.

Signed at Newark, in the county of Essex and State of New Jersey, this 25th day of February, A. D. 1887.

GEO. THEOBALD.

Witnesses:
ABRAHAM MANNERS,
J. C. CLAYTON.